Nov. 12, 1940.  T. I. POTTER  2,221,149
COMPRESSOR
Filed Oct. 15, 1936  2 Sheets-Sheet 1

INVENTOR
THOMAS I. POTTER
BY
ATTORNEY

Nov. 12, 1940.    T. I. POTTER    2,221,149
COMPRESSOR
Filed Oct. 15, 1936    2 Sheets-Sheet 2
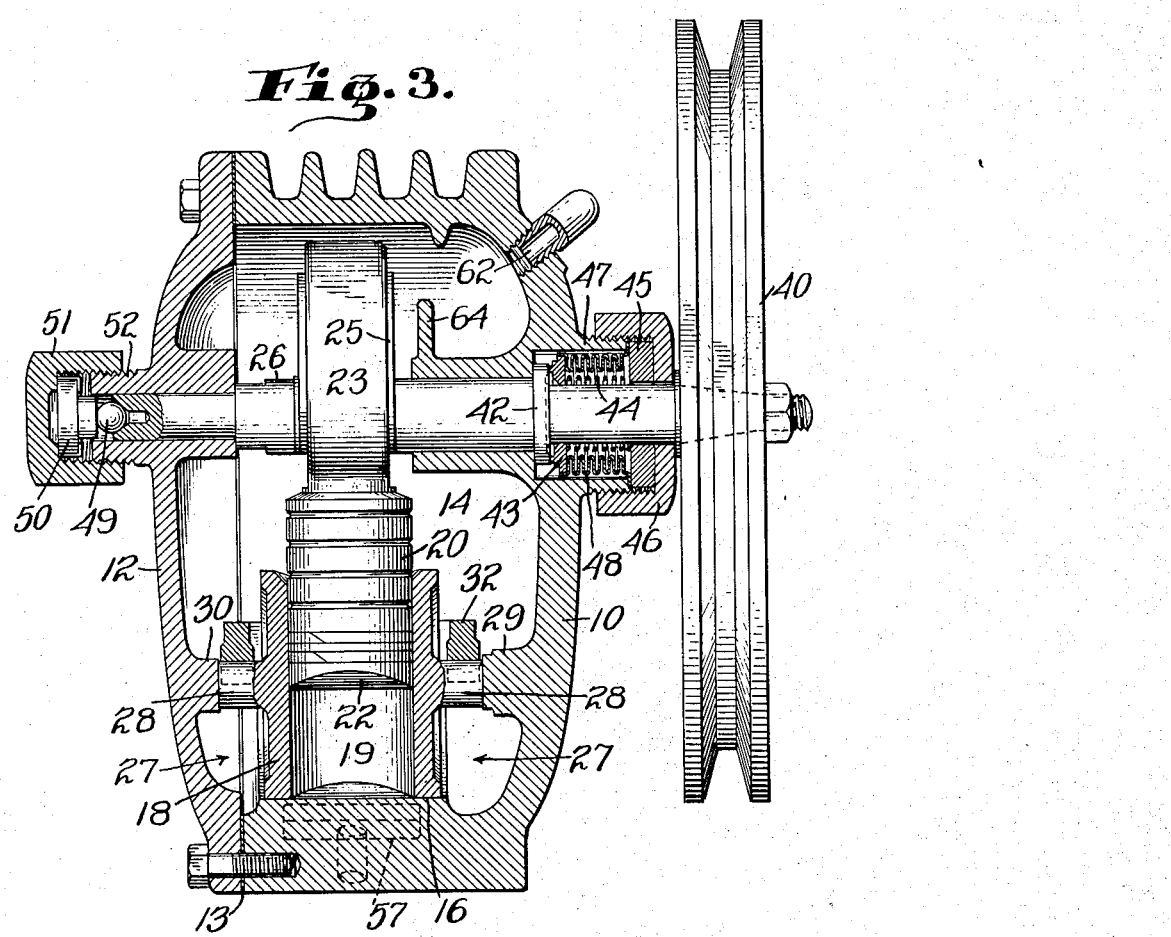
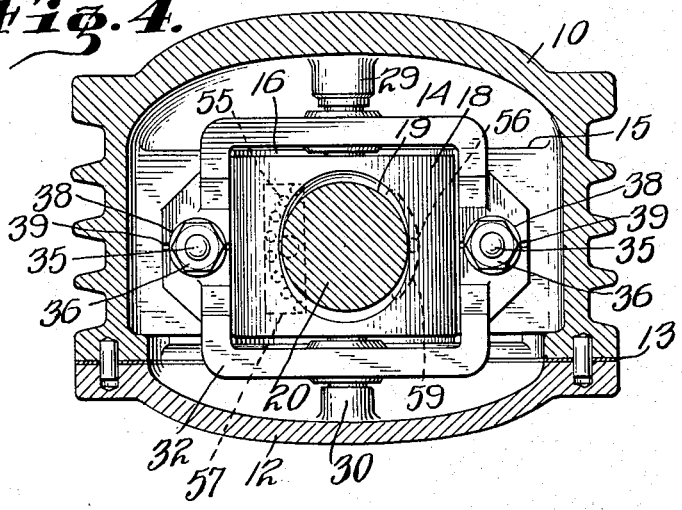
INVENTOR
*Thomas I. Potter*
BY
ATTORNEY Patented Nov. 12, 1940

2,221,149

UNITED STATES PATENT OFFICE 2,221,149

COMPRESSOR

Thomas I. Potter, Buffalo, N. Y.

Application October 15, 1936, Serial No. 105,677

12 Claims. (Cl. 230—175)

The present invention relates to improvements in compressors of the type particularly adapted for use in refrigerators and cooling or refrigerating systems, although compressors embodying my improvements are also adapted for other purposes.

It is an object of my invention to provide a compressor of the reciprocating piston type having a crank case designed to serve as an oil separator. This is of particular importance in refrigerating systems where it is desirable to separate lubricant from the refrigerant. A further object of the invention is to provide a convertible compressor in which the crank case may be either under high or low pressure, as desired.

In a refrigerating system if the crank case is on the high side of the system, the oil will be separated from the compressed refrigerant before it enters the condenser and expander. If, on the other hand, the crank case is on the low side, oil separation will take place immediately before the refrigerant is drawn into the compression cylinder. Each arrangement has its advantages and disadvantages. It will be evident that there is a greater risk of leakage past the bearings of the crank shaft when the crank case is under high pressure than when it is under low pressure and more trouble is apt to be experienced with the seals employed to prevent such leakage. Unless the lubricant is separated from the refrigerant before the latter enters the expander there will be a loss of efficiency due to the fact that the lubricant, being inert and inexpansible, carries heat from the compressor to the expander, which heat must be absorbed by the expanding refrigerant, and to that extent the efficiency of the system is reduced. Furthermore, the lubricant by coating the inner surface of expansion coils serves to impede the passage of heat therethrough. This would seem to indicate that it would be better to have the crank case or oil separator on the high side of the system, despite the increased liability of leakage through the bearings of the crank shaft. However, there are other factors to be considered, namely, the miscibility of oil with certain refrigerants. Methyl chloride, for instance, which is widely used in household refrigerants, is miscible with oil, particularly when under pressure, and it tends to carry oil with it through the expander, depositing the same on the low side of the system. Furthermore, the deposited oil is charged with methyl chloride gas and if such oil enters the compressor cylinder the charge of refrigerant in the oil particles will merely flash out during the suction stroke only to be forced back into the oil on the compression stroke. Obviously, this reduces the capacity of the cylinder for useful work. It will be understood that methyl chloride is mentioned merely as an example and that there are many other refrigerants which act in the same way and with such refrigerants it is of advantage to have the crank case or oil separator on the low side of the system so that particles of oil charged with the gaseous refrigerant will not be pumped into the compressor cylinder. There are other refrigerants, however, which are substantially not miscible with oil, such, for instance, as sulphur dioxide and with such refrigerants it would probably be more economical to separate the oil from the refrigerant on the high pressure side of the system. It will be obvious, therefore, that there are advantages in providing a compressor which is readily convertible for use with the crank case separator either on the high pressure side or on the low pressure side, as desired.

My invention is particularly adapted for use with compressors of the type wherein a floating oscillating cylinder is employed, such cylinder being held endwise against a seat at the bottom of the crank case and the seat being formed with inlet and outlet ports which are alternately opened to the working chamber of the cylinder by oscillation of the cylinder. It is an object of the invention to provide means for taking up wear between the cylinder and its seat and to prevent the cylinder from lifting off the seat particularly where the crank case is connected to the low side of a compressor-condenser-expander system.

Other objects and advantages of my invention will appear in the following description of a preferred embodiment and thereafter the novelty and scope of the invention will be set forth in the claims.

In the accompanying drawings;

Fig. 3 is a view of my compressor in vertical section taken on the line 3—3 of Fig. 1; and Fig. 4 is a view of the compressor in transverse section taken on the line 4—4 of Fig. 1.

Figure 1:
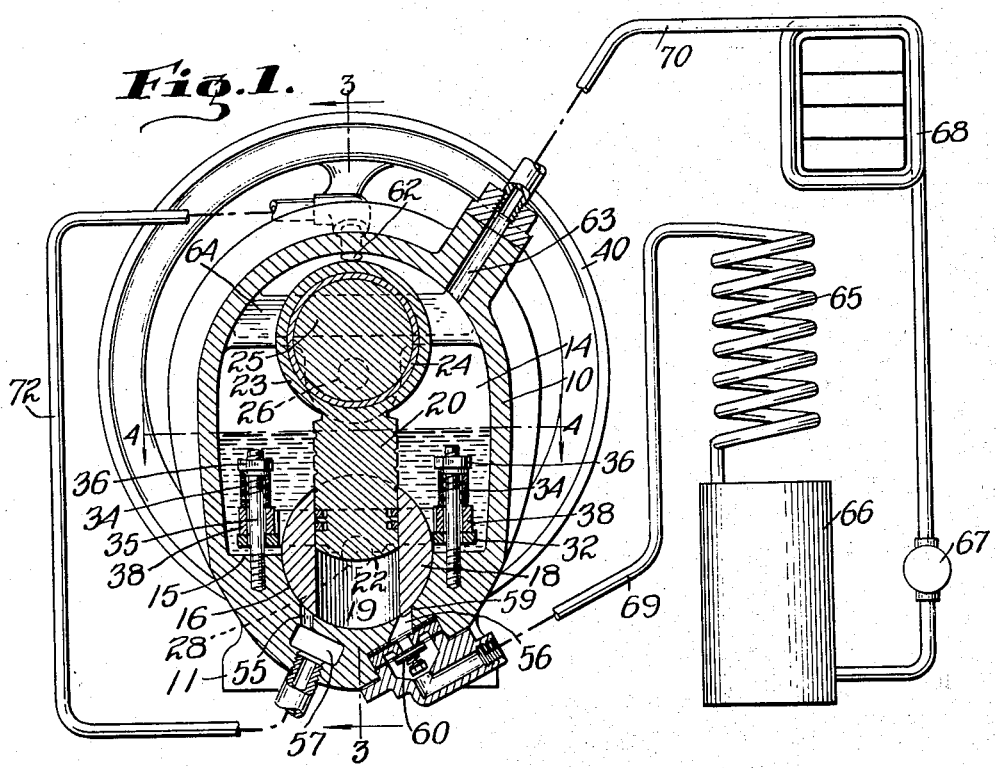
Figure 1 is a view in vertical section of my convertible compressor connected in a refrigerating system with the crank case in the low pressure side of the system.

My convertible compressor comprises a casing 10 of substantially egg-shaped section with the smaller diameter at the lower end, the casing being provided with feet 11 on which it may stand. The front of the casing is closed by a cover plate 12 which is securely bolted fast with an intervening gasket 13 to provide an airtight seal. The interior of this casing constitutes an oil separator chamber 14 in the lower portion of which a body of oil is maintained.

Within the chamber 14 and at the lower end thereof, there is a transverse wall 15 in which a semi-cylindrical bearing 16 is provided. A cylindrical body 18 fits upon and is adapted to oscillate in contact with this seat. The body 18 has a diametric bore 19 extending completely therethrough and constituting a working chamber in which a piston 20 is adapted to reciprocate. The piston is provided with a cylindrically rounded lower end 22 conforming to the curvature of the bearing 16 so that when the piston is completely depressed in the cylinder it will be substantially in contact with the bearing. Actually, in practice, there is a clearance of a few thousandths of an inch between the lower end of the piston and the bearing surface when the piston is in its extreme depressed position.

At its upper end the piston 20 is provided with a cylindrical strap 23 formed with a bushing 24 which fits upon an eccentric 25 formed on a shaft 26. Obviously, the axis of this shaft is parallel to the axis of oscillation of the cylinder body 18, and as the shaft is rotated the piston will be reciprocated and at the same time it will cause the cylinder body 18 to oscillate.

As indicated in Fig. 3, the wall 15 is narrower than the casing leaving pockets 27 filled with oil at the front and rear of the cylinder body 18 so that the bearing 16 is kept lubricated. The piston is also lubricated because the level of oil is maintained well above the top of the cylinder body 18. The cylinder body is maintained against axial displacement by trunnions 28 formed thereon which have a running fit between a lug 29 on the rear wall of the main casing and a lug 30 on the front cover plate.

In order to hold the cylinder 18 down upon the seat or bearing surface 16, I provide a yoke frame 32 which encircles the cylinder and is formed with half-rounded bearings adapted to seat upon the trunnions 28. This yoke frame is pressed downwardly by means of a pair of compression springs 34 at opposite sides of the axis of oscillation of the cylinder. The springs are mounted on studs 35, screwed into the wall 15 and are adjustably held under compression by nuts 36 screwed upon the upper ends of the stud. Instead of having the springs bearing directly on the yoke frame, I prefer to introduce collars 38 between the springs and the yoke frame. The under surface of each collar has a V-shape with the edge of the V engaging a groove 39 in the frame. These grooves lie on a central transverse line passing normally through the axis of oscillation of the cylinder. The purpose of these wedge collars is to permit the cylinder 18 to adjust itself to its seat in case of uneven wear. It will be observed that clearance is provided about the studs where they pass through the wedge collars and the yoke frame.

The shaft 26 is suitably supported in bearings in the upper part of the casing. The shaft extends through the rear wall of the casing and has a pulley 40 fixed thereon for driving the compressor. To prevent leakage along the shaft where it passes through the casing, I provide a seal which may be of any suitable type. The seal shown in Fig. 3, for instance, consists of a collar 42 formed on the shaft and a stationary bearing ring 43 which is held in sealing engagement with the collar by means a spring 44. The latter, at its outer end, is supported by an annular thrust block 45 which, in turn, is held in place by a cap 46 fitted over the disk and screwed upon a cylindrical flange 47 projecting from the casing 10. A flexible bellows 48 is sealed at one end of the disk 43 and at the other end is clamped between the disk 45 and the end of flange 47. The thrust of spring 44 on the shaft is taken up at the opposite end of the shaft by a ball thrust bearing. As shown in the drawings the shaft presses against a ball 49, which, in turn, bears against a thrust block 50 which is held in place by a cap 51 fitted over the thrust block and screwed upon a cylindrical flange 52 projecting from the cover plate 12.

It will be observed that the chamber 14 constitutes an oil reservoir, oil separator, and, crank case. The term "crank case" is used in its generic sense. Functionally an eccentric is the equivalent of a crank. Actually a crank could be substituted for the eccentric 25, and hereinafter where the terms "crank shaft" and "crank case" are employed they will be understood to include an eccentric shaft and an eccentric shaft case.

Formed in the seat 16 is an inlet port 55 and a discharge port 56. The inlet port 55 comprises a series of small orifices arcuately disposed, as shown in Fig. 4, and all opening into a common manifold 57, as shown in Fig. 1. An arcuate groove 59 constitutes the mouth of the port 56. The inlet and outlet ports are so disposed that when the cylinder 18 is in the vertical position, shown in Fig. 1, both ports will be closed with the adjacent edge of the groove 59 substantially alined with the wall of bore 19 on one side while a substantial lap is provided between port 55 and said wall on the other side of the bore.

Preferably, a check valve is provided in the discharge port. This check valve which may be of any standard design is indicated generally by the reference numeral 60. It will be understood that this check valve opens outwardly and being on the high pressure side of the system prevents inflow of gas from the system into the cylinder when the cylinder is opened to the port with the piston in retracted position.

In the upper end of the crank case there are two ports 62 and 63, respectively. Through port 63 refrigerant is introduced into the crank case and through the other port 62 it is withdrawn therefrom. The ports are separated by a baffle plate 64 which forms a pocket from which the port 62 leads outwardly. This prevents direct passage of fluid from one port to the other, thereby facilitating oil separation. Furthermore, the outlet port is protected from splash of lubricant as the crank shaft is revolved.

In Fig. 1, I show the compressor installed in a refrigerating system with the crank case in the low side of the system. At 65, I show a condenser which leads into a receiver 66, whence refrigerant passes through an expansion valve 67 to an expander 68. When the compressor is connected up, as shown in Fig. 1, to effect separation of oil from the refrigerant on the low side of the system a line 69 extends from the discharge port 56 to the condenser 65 and another line 70 extends from the expander 68 to the port 63. The circuit is then completed by a line 72 connecting port 62 to port 55.

In operation, the piston 20 on the suction stroke will draw gas from the crank case or separator 14 through the line 72 into the cylinder 19 and on the compresion stroke this gas will be compressed and forced past the check valve 60 into the line 69. The cylinder and piston being submerged in oil will be thoroughly lubricated and such oil as passes the piston and enters the cylinder may be entrained with the compressed refrigerant and be carried through the condenser-receiver and expander. However, this oil will be separated from the refrigerant when the latter is expanded and will drop into the lower part of the crank case, while the vaporized refrigerant will be drawn off from the upper end of the crank case and will be led to the suction port 55. By reason of this separation there will be substantially no oil introduced into the suction port and hence substantially no effervescence will occur during the suction stroke.

Figure 2:
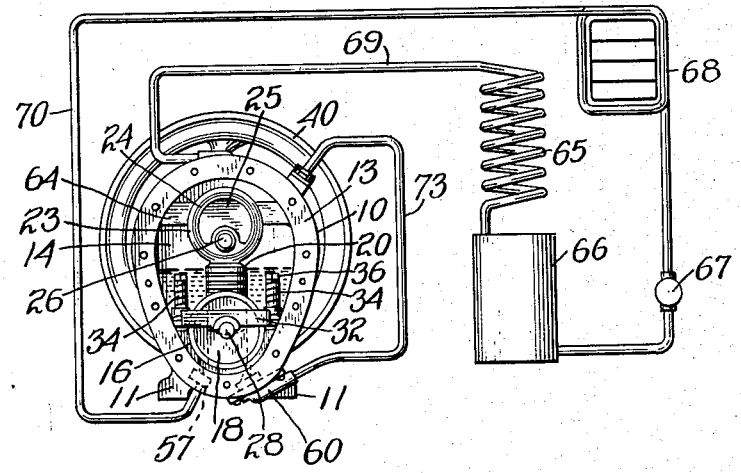
Fig. 2 is a view of the compressor in front elevation with the front plate removed to reveal interior details and with the compressor connected in a refrigerating system in such manner as to separate oil from the refrigerant on the high side of the system.

The ports 62, 63 and 55 and the check valve fitting 60 are all provided with a threaded opening of the same diameter and pitch so that connections thereto will be interchangeable. Thus, if desired, the compressor may be connected up in the manner shown in Fig. 2. When so connected it will be observed that the crank case is under high pressure. In this case, instead of a line 72 connecting the outlet port 62 of the crank case to the suction port 55 there is a line 73 which connects the discharge port 56 to the inlet port 63 of the crank case. The circuit is then completed by connecting line 69 to port 62 and the line 70 directly to the intake port 55. With this arrangement compressed refrigerant will be forced directly into the crank case where the separation of oil from the refrigerant will take place by gravity and then the compressed vaporized refrigerant will be forced on through line 69, condenser 65, receiver 66, expansion valve 67, expander 68 and back through line 70 to the suction port 55. As pointed out above, this has the advantage of reducing the amount of lubricant, if not entirely eliminating the same, that is passed through the expander. The oil trapped in the lower part of the crank case is under compression and serves to hold the cylinder firmly to its seat.

I claim:

1. A compressor for pumping fluid from a low pressure line into a high pressure line, said compressor comprising a sealed crank case forming a lubricant reservoir and separator chamber, a rotary cylinder block at the lower end of the crank case and below the oil level therein and formed with a working chamber, a seat for the cylinder block, a piston reciprocable in the working chamber to alternately draw in and compress charges of said fluid, means comprising a crank shaft extending through the separator chamber above the piston for reciprocating the piston, an inlet port and a discharge port for the working chamber at the lower end of the crank case, an inlet port and a discharge port for the separator chamber at the upper end of the crank case, means adapted to connect the discharge port of either of the chambers to the inlet port of the other chamber, and means for connecting the remaining inlet and discharge ports to said low pressure and high pressure lines respectively and means independent of the pressure of the fluid for determining the pressure of the cylinder block on its seat.

2. A compressor comprising a sealed crank case forming an oil reservoir and separator chamber, a body at the lower end of the crank case formed with a working chamber, a piston reciprocable in the working chamber to alternately draw in and compress charges of fluid, means in the separator chamber for reciprocating the piston, an inlet port and a discharge port for said working chamber, an inlet port and a discharge port for the separator chamber, the latter discharge port being located above the normal oil level in the separator chamber, a baffle in the crank case separating the ports of the separator chamber and in position to shield the discharge port from splash of oil in the separator chamber, and means adapted to connect the discharge port of either of the chambers to the inlet port of the other chamber whereby fluid pumped by the compressor must be passed through the separator chamber.

3. A compressor comprising a sealed crank case forming a lubricant reservoir and separator chamber, a rotary shaft mounted therein, a cylinder mounted to oscillate in the crank case on an axis parallel to but below the shaft and below the oil level in the crank case, said case and cylinder having closely fitting arcuate bearing surfaces for socillation of the cylinder, the cylinder having a working chamber transverse to the axis of oscillation, a piston fitted to slide in the working chamber, a crank connecting the piston and the shaft, whereby rotation of the shaft will cause the piston to reciprocate and the cylinder to oscillate, an inlet port and a discharge port for the cylinder adapted to be alternately opened to said working chamber by oscillation of said cylinder, an inlet port and a discharge port for said separator chamber, and means adapted to connect the discharge port of either one of said chambers to the inlet port of the other chamber and means independent of the pressure of the fluid for regulating the pressure between the arcuate surfaces.

4. A compressor comprising a sealed crank case forming a lubricant reservoir and separator chamber, a rotary shaft mounted therein, a cylinder mounted to oscillate in the crank case on an axis parallel to the shaft, said case and cylinder having closely fitting arcuate bearing surfaces for oscillation of the cylinder, the cylinder having a working chamber transverse to the axis of oscillation, a piston fitted to slide in the working chamber, a crank connecting the piston and the shaft, whereby rotation of the shaft will cause the piston to reciprocate and the cylinder to oscillate, an inlet port and a discharge port for the cylinder adapted to be alternately opened to said working chamber by oscillation of said cylinder, an inlet port and a discharge port for said separator chamber, means connecting the discharge port of the separator chamber to the inlet port of the working chamber, and resilient means comprising a spring-pressed balanced yoke adapted to press the cylinder against the arcuate bearing surface of the crank case.

5. A compressor comprising a sealed crank case forming a lubricant reservoir and separator chamber, a rotary shaft mounted therein, a cylinder mounted to oscillate in the crank case on an axis parallel to the shaft, said case and cylinder having closely fitting arcuate bearing surfaces for oscillation of the cylinder, the cylinder having a working chamber transverse to the axis of oscillation, a piston fitted to slide in the working chamber, a crank connecting the piston and the shaft, whereby rotation of the shaft will cause the piston to reciprocate and the cylinder to oscillate, an inlet port and a discharge port for the cylinder adapted to be alternately opened to said working chamber by oscillation of said cylinder, an inlet port and a discharge port for said separator chamber, means connecting the discharge port of the separator chamber to the inlet port of the working chamber, the cylinder being formed with trunnions on its axis of oscillation, a yoke frame mounted on the trunnions, and spring means exerting pressure on the frame to hold said bearing surfaces in close engagement.

6. A compressor comprising a sealed crank case forming a lubricant reservoir and separator chamber, a rotary shaft mounted therein, a cylinder mounted to oscillate in the crank case on an axis parallel to the shaft, said case and cylinder having closely fitting arcuate bearing surfaces for oscillation of the cylinder, the cylinder having a working chamber transverse to the axis of oscillation, a piston fitted to slide in the working chamber, a crank connecting the piston and the shaft, whereby rotation of the shaft will cause the piston to reciprocate and the cylinder to oscillate, an inlet port and a discharge port for the cylinder adapted to be alternately opened to said working chamber by oscillation of said cylinder, an inlet port and a discharge port for said separator chamber, means connecting the discharge port of the separator chamber to the inlet port of the working chamber, the cylinder being formed with trunnions on its axis of oscillation, a yoke frame mounted on the trunnions, and spring means exerting pressure on the frame to hold said bearing surfaces in close engagement, the mounting of the frame being adapted to permit oscillatory movement of the frame about an axis normal to that of the trunnions.

7. A compressor comprising a crank case the upper portion of which affords a separator chamber, a rotary shaft in the separator chamber, a cylinder mounted to oscillate submerged in oil in the lower part of the crank case on an axis parallel to the shaft, means for providing an arcuate bearing surface for oscillation of the cylinder, said cylinder having a transverse bore therein, a piston in the bore, means driving the piston from the shaft to reciprocate the piston and thereby oscillate the cylinder, inlet and outlet ports alternately opened to said bore by oscillation of the cylinder, inlet and outlet ports through which the fluid being pumped by the compressor flows into and out of the separator chamber, either of said ports being adapted for connection to either of the ports for the bore and means whereby pressure is maintained at the arcuate bearing surface independently of the pressure of the fluid passing through the separator chamber.

8. A compressor for pumping fluid from a low pressure line into a high pressure line, said compressor comprising a sealed crank case forming a lubricant reservoir and separator chamber, a rotary cylinder block at the lower end of the crank case and below the oil level therein and formed with a working chamber, a seat for the cylinder block, a piston reciprocable in the working chamber to alternately draw in and compress charges of said fluid, means comprising a crank shaft extending through the separator chamber above the piston for reciprocating the piston, an inlet port and a discharge port for the working chamber at the lower end of the crank case, an inlet port and a discharge port for the separator chamber at the upper end of the crank case, means connecting the discharge port and inlet port of the separator in the low pressure line and the inlet port of the working chamber to the low pressure line and connecting the discharge port of the working chamber to the high pressure line, and means independent of the pressure of the fluid for determining the pressure of the cylinder block on its seat.

9. A compressor comprising a sealed crank case forming an oil reservoir and separator chamber, a body at the lower end of the crank case formed with a working chamber, a piston reciprocable in the working chamber to alternately draw in and compress charges of fluid, means in the separator chamber for reciprocating the piston, an inlet port and a discharge port for said working chamber, an inlet port and a discharge port for the separator chamber, the latter discharge port being located above the normal oil level in the separator chamber, a baffle in the crank case separating the ports of the separator chamber and in position to shield the discharge port from splash of oil in the separator chamber, and means connecting the discharge port of the separator chamber to the inlet port of the working chamber whereby fluid pumped by the compressor must be sucked through the separator chamber.

10. A compressor comprising a sealed crank case forming an oil reservoir and separator chamber, a body at the lower end of the crank case formed with a working chamber, a piston reciprocable in the working chamber to alternately drawn in and compress charges of fluid, means in the separator chamber for reciprocating the piston, an inlet port and a discharge port for said working chamber, an inlet port and a discharge port for the separator chamber, the latter discharge port being located above the normal oil level in the separator chamber, a baffle in the crank case separating the ports of the separator chamber and in position to shield the discharge port from splash of oil in the separator chamber, and means for connecting the discharge port of the working chamber to the inlet port of the separator chamber whereby fluid pumped by the compressor must be passed through the separator chamber.

11. A compressor comprising a sealed crank case forming a lubricant reservoir and separator chamber, a rotary shaft mounted therein, a cylinder mounted to oscillate in the lubricant reservoir of the crank case on an axis parallel to the shaft, said case and cylinder having closely fitting arcuate bearing surfaces for oscillation of the cylinder, the cylinder having a working chamber transverse to the axis of oscillation, a piston fitted to slide in the working chamber, a crank connecting the piston and the shaft, whereby rotation of the shaft will cause the piston to reciprocate and the cylinder to oscillate, an inlet port and a discharge port for the cylinder adapted to be alternately opened to said working chamber by oscillation of said cylinder, an inlet port and a discharge port for said separator chamber, means connecting the discharge port of the separator chamber to the inlet port of the working chamber, and resilient means comprising a spring-pressed balanced yoke adapted to press the cylinder against the arcuate bearing surface of the crank case.

12. A compressor comprising a sealed crank case forming a lubricant reservoir and separator chamber, a rotary shaft mounted therein, a cylinder mounted to oscillate in the lubricant reservoir of the crank case on an axis parallel to the shaft, said case and cylinder having closely fitting arcuate bearing surfaces for oscillation of the cylinder, the cylinder having a working chamber transverse to the axis of oscillation, a piston fitted to slide in the working chamber, a crank connecting the piston and the shaft, whereby rotation of the shaft will cause the piston to reciprocate and the cylinder to oscillate, an inlet port and a discharge port for the cylinder adapted to be alternately opened to said working chamber by oscillation of said cylinder, an inlet port and a discharge port for said separator chamber, means connecting the discharge port of the separator chamber to the inlet port of the working chamber, the cylinder being formed with trunnions on its axis of oscillation, a yoke frame mounted on the trunnions, and spring means located in said lubricant reservoir, exerting pressure on the frame to hold said bearing surfaces in close engagement.

THOMAS I. POTTER.